(12) United States Patent
Guisasola (10) Patent No.: US 11,530,639 B2
(45) Date of Patent: Dec. 20, 2022

(54) PRE-CHAMBER BODY FOR AN INTERNAL COMBUSTION ENGINE

(71) Applicant: Caterpillar Energy Solutions GmbH, Mannheim (DE)

(72) Inventor: Inigo Guisasola, Mannheim (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 17/056,668

(22) PCT Filed: May 14, 2019

(86) PCT No.: PCT/EP2019/025148
§ 371 (c)(1),
(2) Date: Nov. 18, 2020

(87) PCT Pub. No.: WO2019/228665
PCT Pub. Date: Dec. 5, 2019

(65) Prior Publication Data
US 2021/0207523 A1    Jul. 8, 2021

(30) Foreign Application Priority Data
May 28, 2018  (GB) ...................................... 1808687

(51) Int. Cl.
*F02B 19/18*  (2006.01)

(52) U.S. Cl.
CPC .................................. *F02B 19/18* (2013.01)

(58) Field of Classification Search
CPC .......... F02B 19/18; F02B 21/02; F02B 23/00; F02B 19/16
See application file for complete search history.

(56) References Cited

U.S. PATENT DOCUMENTS

| 2,804,858 A | 9/1957 | Schilling |
| 2,969,050 A * | 1/1961 | Greier ..................... F02B 19/18 123/270 |
| 4,930,473 A * | 6/1990 | Dietrich .................. F02B 19/12 123/169 EL |
| 5,924,402 A | 7/1999 | Regueiro |

(Continued)

FOREIGN PATENT DOCUMENTS

| DE | 1045159 B | 11/1958 |
| DE | 4001142 A1 | 7/1991 |

(Continued)

OTHER PUBLICATIONS

International Search Report for related Application No PCT/EP2019/025148; dated Aug. 9, 2019.

(Continued)

*Primary Examiner* — Xiao En Mo (57) ABSTRACT

The present invention pertains to a pre-chamber body for an internal combustion engine. The pre-chamber body comprises a pre-chamber tip with a pre-chamber defined by an encircling side wall and at least one flow transfer passage fluidly connecting the pre-chamber and an exterior of the pre-chamber body (1), the flow transfer passage extending through the encircling wall, wherein the side wall is provided with at least one stiffness reduced section in proximity or adjacent to the flow transfer passage.

15 Claims, 5 Drawing Sheets

(56) References Cited

U.S. PATENT DOCUMENTS

| | | |
|---|---|---|
| 6,854,439 B2 | 2/2005 | Regueiro |
| 7,216,623 B2 | 5/2007 | Taraji et al. |
| 9,593,622 B2 | 3/2017 | Kim |
| 2007/0089703 A1 | 4/2007 | Shiraishi et al. |
| 2010/0326400 A1 | 12/2010 | Hayes, Jr. |
| 2014/0261298 A1* | 9/2014 | Sasidharan ............ F02B 19/12 123/286 |
| 2015/0083070 A1* | 3/2015 | Becker ................... F02F 1/26 123/254 |
| 2016/0053673 A1* | 2/2016 | Sotiropoulou .......... F02B 19/12 123/260 |
| 2016/0326946 A1* | 11/2016 | Willi ..................... F02B 19/10 |
| 2016/0348570 A1* | 12/2016 | Willi ..................... F02B 19/12 |

FOREIGN PATENT DOCUMENTS

| | | | |
|---|---|---|---|
| EP | 2700796 A1 | 2/2014 | |
| EP | 3181855 A1 | 6/2017 | |
| FR | 2810692 A1 * | 12/2001 | ............... F02B 1/12 |
| GB | 2545479 A | 6/2017 | |
| JP | 2014129788 A | 7/2014 | |
| JP | 2017101647 A | 6/2017 | |
| WO | 9112418 | 8/1991 | |
| WO | 2014094808 A1 | 6/2014 | |
| WO | 2019065053 A1 | 4/2019 | |

OTHER PUBLICATIONS

Search Report for related GB Application No. 1808687.6; dated Nov. 5, 2018.

* cited by examiner

Fig. 1

Prior Art

PRE-CHAMBER BODY FOR AN INTERNAL COMBUSTION ENGINE

CROSS-REFERENCE TO RELATED APPLICATION

This Application is a 35 USC § 371 US National Stage filing of International Application No, PCT/EP2019/025148 filed on May 14, 2019 which claims priority under the Paris Convention to Great Britain Patent Application No. 1808687.6 filed on May 28, 2018.

TECHNICAL FIELD

The present invention relates to a pre-chamber body for an internal combustion engine, and, in particular, a pre-chamber body for a natural gas internal combustion engine of a high specific output.

TECHNOLOGICAL BACKGROUND

Internal combustion engines and especially internal combustion engines which are powered with a lean fuel air mixture of a gaseous fuel and air, for example a mixture of natural gas and air, may comprise a pre-chamber, which is also referred to as a pre-combustion chamber, per cylinder for ignition purposes. Large-bore engines may benefit from those pre-chambers as it is otherwise difficult to consistently achieve complete and thorough combustion using lean fuel air mixtures.

The pre-chamber body typically comprises a pre-chamber tip including the actual pre-chamber which is defined by an encircling wall of the pre-chamber. Flow transfer passages are fluidly connecting the pre-chamber and the exterior of the pre-chamber body, and in particular fluidly connecting the pre-chamber and the main combustion chamber of the respective cylinder. The flow transfer passages allow the flow of the lean mixture of gaseous fuel and air from the main combustion chamber into the pre-chamber during the compression stroke. The lean mixture of gaseous fuel and air in the pre-chamber is then ignited in the pre-chamber by an igniter such as a spark plug. The ignition of the lean mixture causes a flame front of hot gases that propagates from the pre-chamber through the flow transfer passages into the main combustion chamber. The flame front is lead by the flow transfer passages to form ejecting torches which are directed in different directions such that a homogenous and more preferred ignition of the gaseous mixture in the main combustion chamber can be achieved.

In preferred embodiments the lean mixture of the gaseous fuel and air which is transferred into the pre-chamber at the compression stroke of the cylinder can also be enriched by adding small quantities of gaseous fuel directly into the pre-chamber via a separate fuel feed passage and, consequently, the enriched mixture is ignited by the spark plug.

U.S. Pat. No. 6,854,439 B2 discloses a pre-chamber combustion system which is particularly suited for larger type Diesel engines.

The tip of the pre-chamber body experiences high temperatures during operation. Natural gas internal combustion engines of higher specific outputs may be used in a combination with an electric generator as so called twin sets and are employed as fast regulating power plants to keep the grid conditions stable. In such a manner of operation, many starts and stops of the large natural gas internal combustion engine are typically effected such that the pre-chamber body and, in particular, the pre-chamber tip undergoes frequent heating and cooling cycles which may lead to increased wear of the pre-chamber bodies.

SUMMARY OF THE INVENTION

Starting from the prior art, it is an objective of the present invention to provide a pre-chamber body for an internal combustion engine which has improved wear characteristics.

This objective is solved by means of a pre-chamber body with the features of claim 1. Preferred embodiments can be taken from the Figures, the specification as well as the dependent claims.

Accordingly, a pre-chamber body for an internal combustion engine is provided. The pre-chamber body comprises a pre-chamber tip with a pre-chamber which is defined by an encircling side wall and at least one flow transfer passage fluidly connecting the pre-chamber and an exterior of the pre-chamber body. The flow transfer passage extends through the encircling wall. Further, the side wall is provided with at least one stiffness reduced section in proximity or adjacent to the flow transfer passage.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

In the following, the invention will be explained in more detail with reference to the accompanying Figures. In the Figures, like elements are denoted by identical reference numerals and repeated description thereof may be omitted in order to avoid redundancies.

Figure 1:
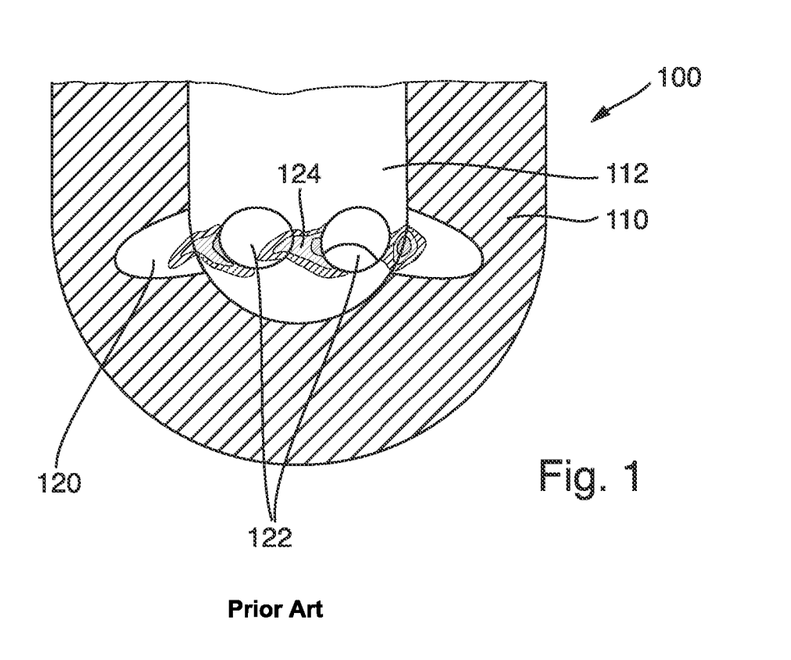
FIG. 1 shows a longitudinal section of a conventional pre-chamber tip of simulated areas of maximum compressive stress and plastic deformations.

FIG. 1 is a schematic longitudinal section through a conventional pre-chamber tip 100 including a side wall 110 which encircles a pre-chamber 112 defined inside of the pre-chamber tip 100.

Flow transfer passages 120 are provided which extend through the side wall 110 from the pre-chamber 112 towards an exterior of the pre-chamber tip 100. As such, each of the flow transfer passages 120 constitutes a through hole in the side wall 110, thereby fluidly connecting the pre-chamber 112 with the exterior of the pre-chamber tip 100.

Each of the flow transfer passages 120 has an outer opening formed at an outer surface of the pre-chamber tip 100, which is not explicitly shown in FIG. 1, and an inner opening 122 which opens the respective flow transfer passage 120 into the pre-chamber 112. Adjacent inner openings 122 are separated from one another by a section of material 124 of the side wall 110. In other words, between adjacent inner openings 122, the sections of material 124 of the side wall 110 remain.

Finite element analysis has shown that these sections of material 124 in the area between the inner openings 122 of the flow transfer passages 120 are most susceptible to compressive stresses and plastic deformations induced by heating and cooling cycles during operation of the pre-chamber tip 100. It has shown that, in conventional pre-chambers, these sections of material 124 are subjected to larger wear as compared to other areas of the conventional pre-chamber tip 100.

Figure 2:
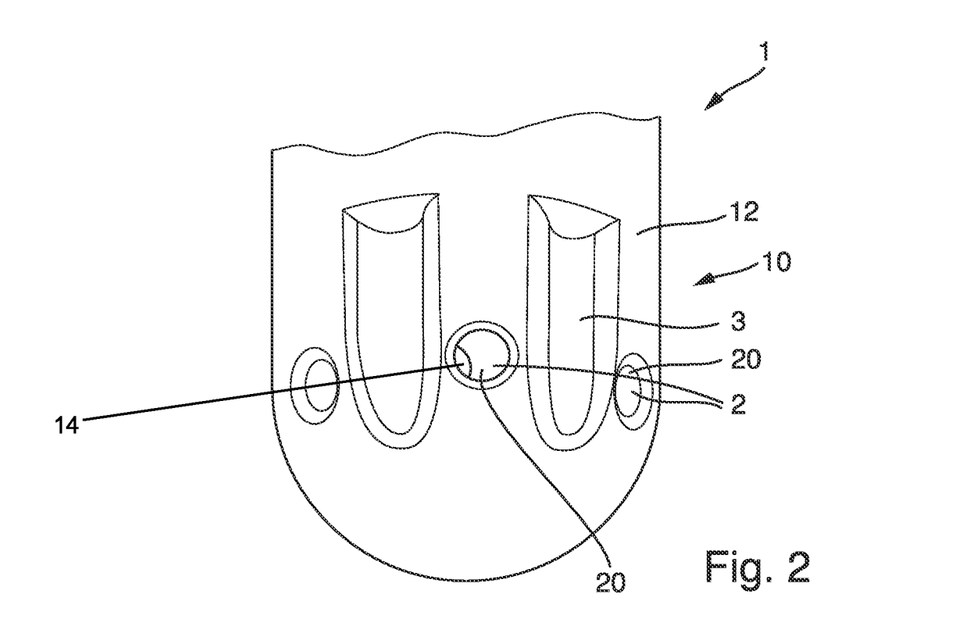
FIG. 2 shows a perspective view of a pre-chamber tip according to a first embodiment.

In order to reduce the compressive stresses acting upon certain areas of a pre-chamber tip, a pre-chamber body 1, and, in particular, a pre-chamber tip 10 according to a first embodiment is provided which is shown in FIG. 2. The pre-chamber tip 10 according to this embodiment includes a side wall 12 which encircles and defines a pre-chamber 14 received within the pre-chamber tip 10. Flow transfer passages 2 may be provided in the side wall 12, each of which fluidly connects the pre-chamber 14 received within the pre-chamber tip 10 with an exterior of the pre-chamber body 1. The flow transfer passages 2 are shown in FIG. 2 in the form of bores. Specifically, at an outer surface of the pre-chamber tip 10, the flow transfer passages 2 comprise outer openings 20, via which the flow transfer passages 2 open out to the exterior of the pre-chamber body 1.

Between adjacent flow transfer passages 2, a stiffness reduced section 3 is provided such that a material thickness of the side wall 12 is reduced in proximity to the flow transfer passages 2. In FIG. 2, the stiffness reduced section 3 is provided in the form of a machined away portion of the material constituting the side wall 12. Specifically, the stiffness reduced section 3 is a groove or a notch extending along a longitudinal direction of the pre-chamber body 1 between adjacent flow transfer passages 2. In other words, the stiffness reduced section 3 is provided in the form of a section of the side wall 11, in which the material thickness of the side wall 12 is reduced.

In this context, the term "material thickness" is intended to refer to a dimension of the side wall in a direction perpendicular to an outer surface thereof. In other words, the stiffness reduced section may constitute an area of the pre-chamber tip in which less material is used compared to other sections of the side wall, in particular a section of the side wall arranged adjacent to the stiffness reduced section. The areas of reduced stiffness may be provided by means of recesses or notches or millings, which result in a reduced thickness of the material of the side wall encircling and defining the pre-chamber.

It is to be noted that the stiffness reduced section 3, which is provided in the form of a thickness reduced section, is provided between the flow transfer passages 2 and, in particular, between the outer openings 20 of the flow transfer passages 2. In this way, the stiffness reduced section provides a reduced thickness of the side wall 12 in an area between the flow transfer passages 2, but not including the areas where the flow transfer passage 2 is situated in the side wall 12 of the pre-chamber tip 10.

In other words, the flow transfer passages 2 may have the same dimensions as in a corresponding conventional pre-chamber body. Accordingly, the function of the flow transfer passages 2, namely to eject ignition torches from the pre-chamber into a (not shown) cylinder cavity, may still be fulfilled in the same manner as in a conventional pre-chamber body. However, by means of the stiffness reduced sections 3, the pre-chamber tip 10 may be made less rigid. In this way, the section of material in the area between the flow transfer passages 2, in particular between inner openings of the flow transfer passages 2, may be effectively prevented from being subjected to excessive loads due to the heating and cooling cycles. In particular, the compressive stress upon the areas between the flow transfer passages 2 and, in particular, the areas between the inner openings of the flow transfer passages 2 may be reduced by means of the stiffness reduced section 3. As a result, the wear of the pre-chamber tip 10 can be reduced during the heating and cooling cycles compared to conventional pre-chamber tips.

Figure 3:
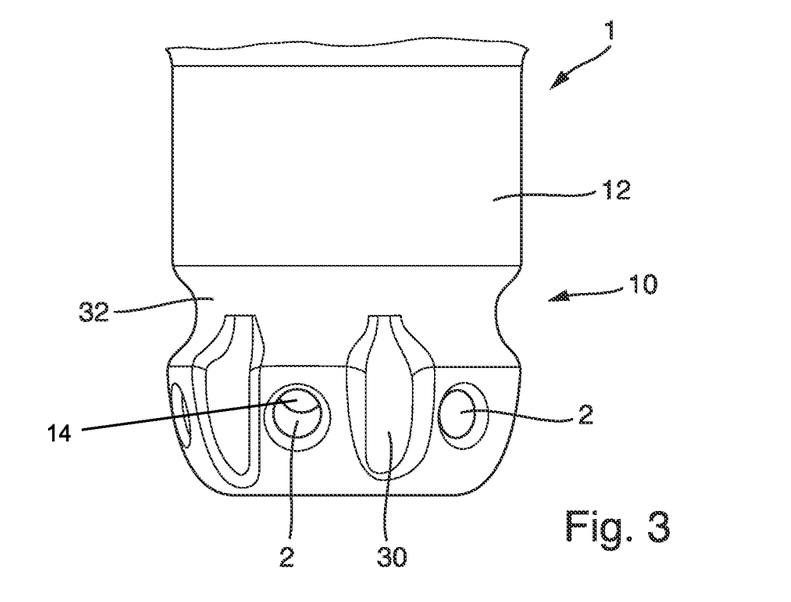
FIG. 3 shows a perspective view of a pre-chamber tip according to a second embodiment.

FIG. 3 shows another embodiment of a pre-chamber body 1 and, in particular, of the pre-chamber tip 10 of the pre-chamber body 1 which is provided with flow transfer passages 2. In the pre-chamber tip 10, a first stiffness reduced section 30 is present which is shown in the form of a machined away section, in particular a notch, extending along the longitudinal direction between the flow transfer passages 2 in the side wall 12.

In addition to the first stiffness reduced section 30, a second stiffness reduced section 32 may be present which may be provided in the form of a circumferential groove extending circumferentially around the pre-chamber tip 10. In this way, the pre-chamber tip 10 may be further softened in an area in the proximity of the flow transfer passages 2.

Figure 4:
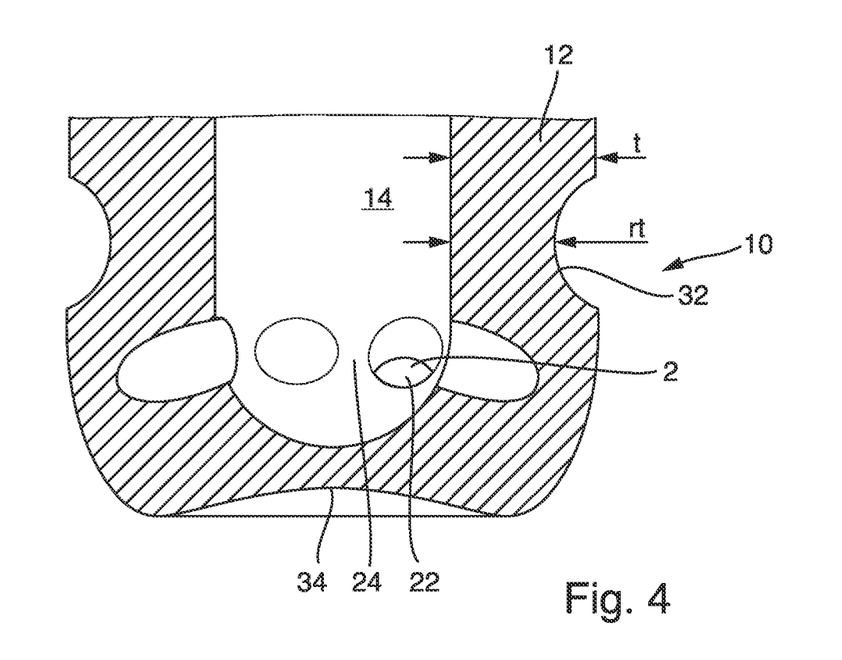
FIG. 4 shows a longitudinal section through the pre-chamber tip of FIG. 3.

In FIG. 4, a longitudinal section through the pre-chamber tip 10 shown in FIG. 3 is shown, in which the provision of the groove constituting the second stiffness reduced section 32 can be clearly seen. As can be gathered from FIG. 4, the side wall 12, due to the second stiffness reduced section 32, has a reduced material thickness rt that may be substantially 75% of a non-reduced material thickness t of a section of the side wall 12 arranged adjacent to the second stiffness reduced section 32.

The inner openings 22 of the flow transfer passages 2 are also depicted as well as the sections of material between the inner openings 22, wherein these sections are identified by reference numeral 24. The pre-chamber as such is shown at reference numeral 14.

The pre-chamber tip 10 according to FIGS. 3 and 4 additionally includes a milled-away section 34 at its end face, where a yet more reduced thickness of the side wall 12 is achieved. For example, the milled-away section 34 may be made by ball milling.

In this context, the term "end face" is intended to refer to a front surface of the pre-chamber tip which faces the exterior of the pre-chamber body. For example, the stiffness reduced section may be a milled-away section made by ball milling the head of the pre-chamber tip.

It has been shown that in the embodiment of the pre-chamber tip 10 according to FIGS. 3 and 4 the compressive stress induced in the sections 24 between the inner openings 22 of the flow transfer passages 2 may be considerably reduced by means of the stiffness reduced sections 30, 32 and 34.

Figure 5:
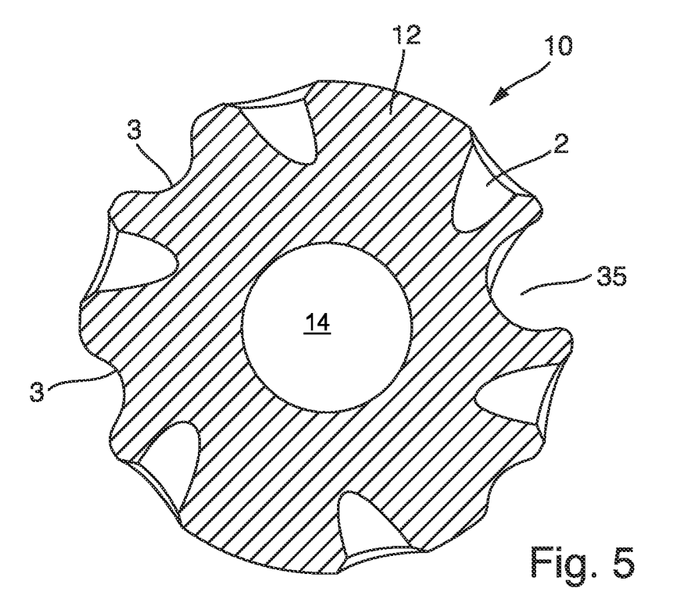
FIG. 5 shows a cross-section through the lower part of a pre-chamber tip according to a third embodiment.

FIG. 5 shows a cross-section perpendicular to the longitudinal extension of yet another embodiment of a pre-chamber tip 10, wherein transfer flow passages 2 are shown and stiffness reduced sections 35 may be present in different shapes in the outer area of the side wall 12 of the pre-chamber tip 10. Specifically, the stiffness reduced section 35 may extend helicoidally over the outer area of the side wall 12 along a longitudinal direction of the pre-chamber body 1.

Figure 6:
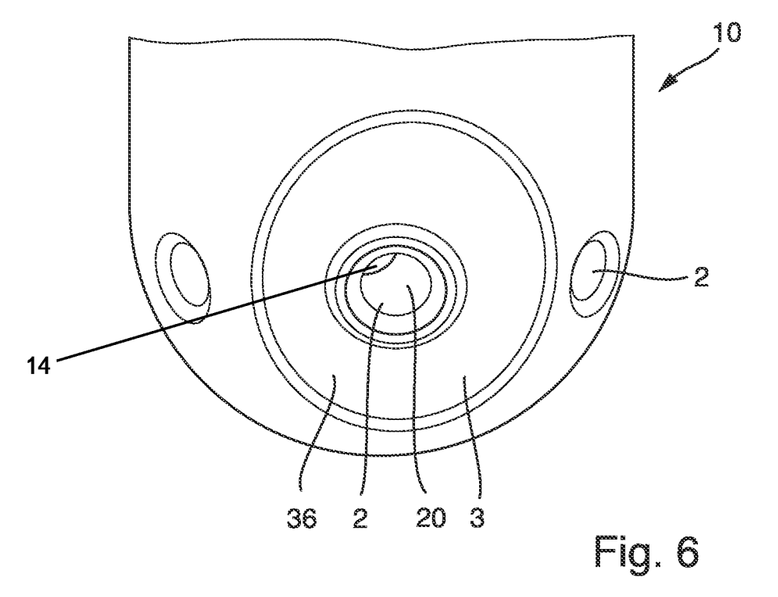
FIG. 6 shows a schematic view of a pre-chamber tip according to a fifth embodiment.

In FIG. 6, yet another embodiment of a pre-chamber tip 10 is shown, wherein at least one flow passage 2 may be surrounded by a stiffness reduced section 36. Specifically, the stiffness reduced section 36 may be provided in the form of a circular milling groove around the flow transfer passage 2, in particular around the outer opening 20 of the flow transfer passage 2. The actual manufacturing process may be present in the form that a stepped tool is used which provides for the bore constituting the flow transfer passage 2 as well as for the stiffness reduced section 36 in the form of the milled-away material.

Figure 7:
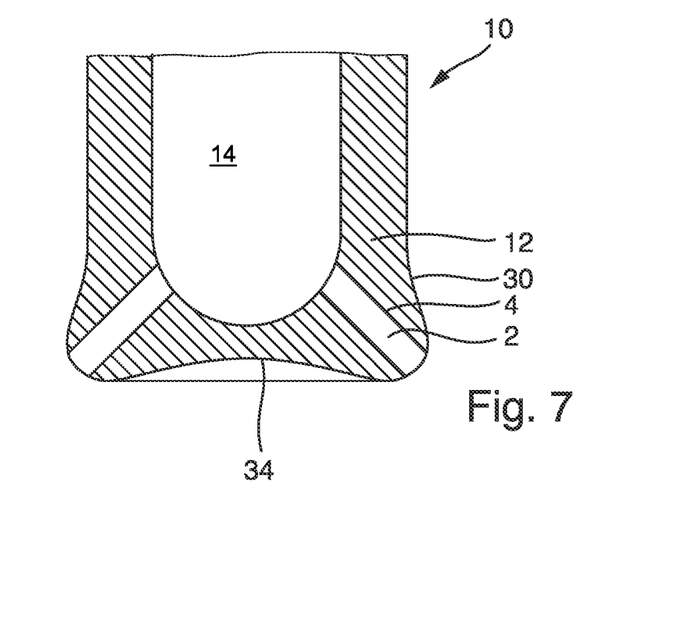
FIG. 7 shows a schematic longitudinal section through a pre-chamber tip according to a sixth embodiment.

FIG. 7 shows yet another embodiment of a pre-chamber tip 10, in which the thickness of the side wall 12 may be partially reduced to provide stiffness reduced sections 30 as well as 34. The flow transfer passages 2 may be provided in the side wall 12 by means of tubes 4 which may be inserted into the material and which may extend through the side wall 12 in a thickness direction thereof. The tubes 4 may enable a specific material composition which may also lead to further stiffness reduced sections around the flow transfer passages 2.

Figure 8:
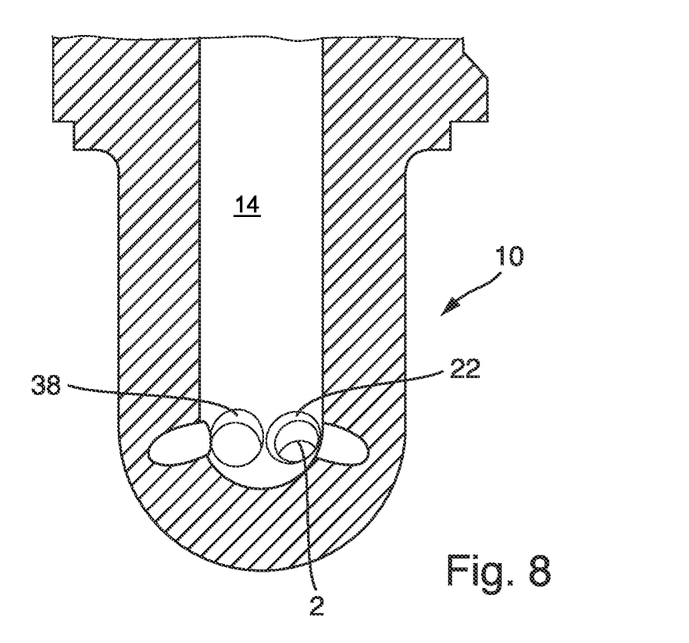
FIG. 8 shows a schematic longitudinal section through a pre-chamber tip according to a seventh embodiment.

In FIG. 8, another embodiment of a pre-chamber tip 10 is shown, in which the flow transfer passages 2 include an inner opening 22 and the inner opening 22 may be smoothened or phased or rounded by means of a rounding tool which may be inserted from the exterior of the pre-chamber body 1. In this embodiment, the stiffness reduced sections 38 may be provided in form of countersinks at the inner openings 22 of the flow transfer passages 2. Due to the stiffness reduced sections 38 in the form of the countersinks, a material thickness of the side wall 12 may be reduced in areas adjacent to the flow transfer passages 2.

Figure 9:
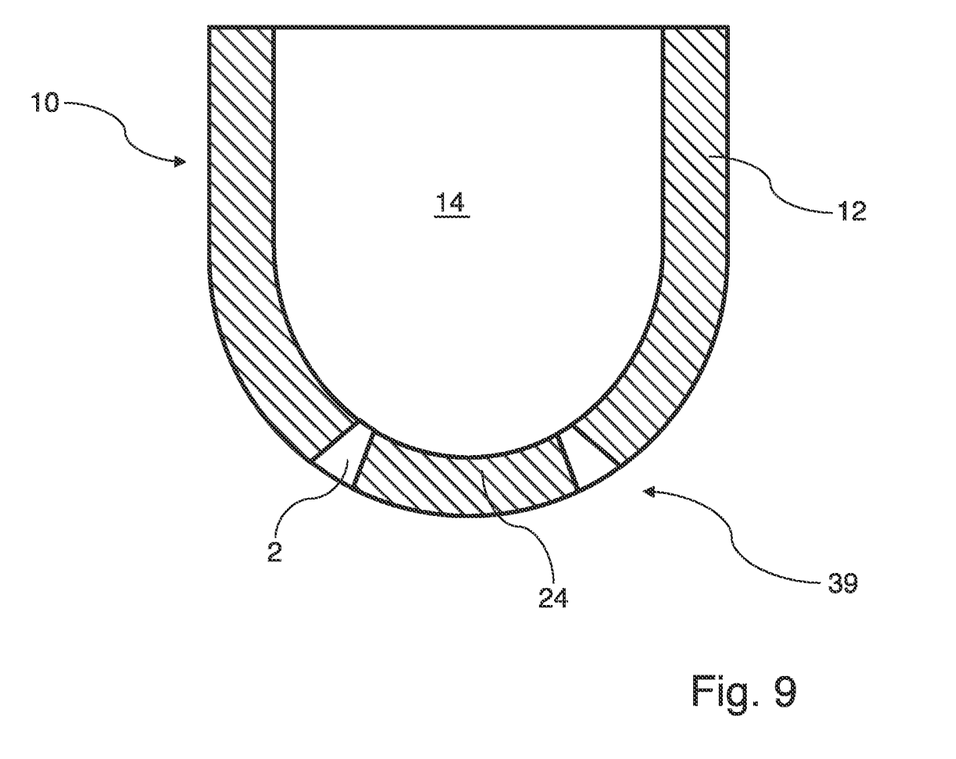
FIG. 9 shows a schematic longitudinal section through a pre-chamber tip according to another embodiment.

In FIG. 9, another embodiment of a pre-chamber tip 10 is shown. The flow transfer passages 2 may be provided in a conical shape. This may result in a considerably increased area 24 on the inside of the wall 12 defining the pre-chamber 14 such that the considerably increased sections 24 may be less inclined to compressive stresses and plastic deformation. Specifically, the stiffness reduced sections 39 may be provided in the form of a conical flow transfer passage 2, which may taper in a direction from the exterior of the pre-chamber body 1 to the pre-chamber 14.

It will be obvious for a person skilled in the art that the embodiments and items mentioned before only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A pre-chamber body for an internal combustion engine may be provided. The pre-chamber body may comprise a pre-chamber tip with a pre-chamber which may be defined by an encircling side wall and may have at least one flow transfer passage fluidly connecting the pre-chamber and an exterior of the pre-chamber body. The flow transfer passage may extend through the encircling wall. Further, the side wall may be provided with at least one stiffness reduced section in proximity or adjacent to the flow transfer passage.

It has been found that the tensions which are induced in the tip of the pre-chamber body by high and frequent temperature fluctuations during operation of the engine may be reduced by means of the stiffness reduced section. Thus, as the pre-chamber tip may comprise at least one stiffness reduced section, the wear of the pre-chamber body and, in particular, of the pre-chamber tip during the heating and cooling cycles may be reduced.

More specifically, due to the stiffness reduced section, a material thickness of the side wall may be reduced. In this context, the term "material thickness" is intended to refer to a dimension of the side wall in a direction perpendicular to an outer surface thereof. In other words, the stiffness reduced section may constitute an area of the pre-chamber tip in which less material is used compared to other sections of the side wall, in particular a section of the side wall arranged adjacent to the stiffness reduced section. The areas of reduced stiffness may be provided by means of recesses or notches or millings, which result in a reduced thickness of the material of the side wall encircling and defining the pre-chamber.

The pre-chamber tip may be designed such that, due to the stiffness reduced section, the material thickness of the side wall may be locally reduced, in particular in proximity or adjacent to the flow transfer passage. By providing the stiffness reduced section a load optimized design of the pre-chamber tip may be realized.

The side wall, due to the stiffness reduced section, may be provided with a reduced material thickness that is between 50% and 90% of a non-reduced material thickness present in the section of the side wall arranged adjacent to the stiffness reduced section. Specifically, the reduced material thickness of the side wall may be 50% or 75% of the non-reduced material thickness. In this context, the non-reduced material thickness may be a maximum material thickness of the side wall.

By providing the stiffness reduced section in the proximity of the flow transfer passage, the dimensions of the flow transfer passages and, in particular, its diameter and its length may be the same as in a similar pre-chamber body without the stiffness reduced section. Accordingly, the pre-chamber body may be of the type used in a specific engine and the stiffness reduced areas may subsequently by provided in the side wall of the pre-chamber tip without altering the dimensions of the flow transfer passages. In other words, the material of the pre-chamber tip situated around the flow transfer passages may remain as in a conventional pre-chamber tip.

At least one stiffness reduced section may be situated between two adjacent flow transfer passages. In this way, in areas between the flow transfer passages, i.e. the stiffness reduced sections, the thickness of the side wall may be reduced vis-à-vis the thickness of the side wall in the areas where the flow transfer passage is situated.

The pre-chamber tip may be provided with a plurality of flow transfer passages evenly distributed along a circumference of the pre-chamber tip forming a ring of flow transfer passages, wherein, between two adjacent flow transfer passages, one stiffness reduced section may be provided, respectively.

The at least one stiffness reduced section may also be provided in an area above or below the ring of flow transfer passages or distal and/or proximal of a plane defined by the flow transfer passages.

The at least one stiffness reduced section may be provided on an outside of the side wall which faces the exterior of the pre-chamber body. Additionally or alternatively, the at least one stiffness reduced section may be provided on an inside of the side wall which faces the pre-chamber.

The at least one stiffness reduced section may be or may comprise a groove or a notch extending along a longitudinal direction of the pre-chamber body.

At least one stiffness reduced section may extend helicoidally over the side wall along a longitudinal direction of the pre-chamber body.

At least one stiffness reduced section may extend circumferentially around the longitudinal direction of the pre-chamber body.

Such a circumferentially extending stiffness reduced section as mentioned before may be provided on an outside of the side wall. The circumferentially extending stiffness reduced section may be provided on an inside of the side wall. For example, the stiffness reduced section may be a circumferential groove extending around a circumference of the pre-chamber tip.

At least one stiffness reduced section may be provided at an end face of the pre-chamber body tip. In this context, the term "end face" is intended to refer to a front surface of the pre-chamber tip which faces the exterior of the pre-chamber body. For example, the stiffness reduced section may be a milled-away section made by ball milling the head of the pre-chamber tip.

At least one stiffness reduced section may be provided circumferentially around the flow transfer passage, for example in a circular manner. Specifically, the stiffness reduced section may be provided in the form of a circular milling groove around an outer opening of the flow transport passage. Such a circular extending stiffness reduced section around the flow transfer passage may be provided on the outside and/or inside of the side wall.

The structural design of the stiffness reduced section according to the afore-specified examples and/or embodiments may provide for a reduced thickness of the side wall encircling and defining the pre-chamber in areas around the flow transfer passages, but may not include the areas where the flow transfer passage is situated in the side wall of the pre-chamber tip.

The stiffness reduced sections may also be provided in the flow transfer passages, in particular by means of phasing or rounding the opening of the flow transfer passage at one end of the pre-chamber, i.e. inside of the pre-chamber tip. Accordingly, at least one stiffness reduced section may be a recess or countersink provided at an inner opening of the flow transfer passage.

Stiffness reduced sections in the form of a reduced wall thickness of the pre-chamber tip may be present, wherein the material around the flow transfer passages may be set in a manner that it may extend from the remaining surface of the pre-chamber body.

The flow transfer passage may be formed by at least one tube extending through the side wall. In this way, the tube may be made of a specific material composition leading to a stiffness reduced section around the flow transfer passage.

The flow transfer passage may be provided in a form in which it may have a conical bore such that the material remaining on the inside of the pre-chamber tip, i.e. on the inside of the pre-chamber tip between the inner openings of the flow transfer passages pointing towards the inside of the pre-chamber tip, may be enlarged. Accordingly, at least one stiffness reduced section may be provided in the form of a conical flow transfer passage, which may in particular taper in a direction from the exterior of the pre-chamber body to the pre-chamber.

The compressive stress which may be exerted upon the pre-chamber tip due to the heating and cooling cycles and, in particular, upon the sections inside of the pre-chamber between the openings of the flow transfer passages may be reduced by means of the provision of the stiffness reduced sections in the pre-chamber tip. This finding of reduced compressive stresses acting on the material on the inside of the pre-chamber tip may be independent of whether the material removal in order to produce the stiffness reduced section is situated on the outer surface of the pre-chamber tip or on the inner surface of the pre-chamber tip. It has been found that it may be of relevance only that the pre-chamber tip is made less rigid in the areas in the proximity of the flow transfer passages.

The pre-chamber tip may be made softer than in the pre-chamber tips of the prior art, such that the compressive stress in the material defining the pre-chamber tip may be reduced. This also may lead to a lower amount of deformation or plastification of the material in the heating and cooling cycles during operation.

Thus, due to the stiffness reduced sections, the compressive stress exerted on the material defining the pre-chamber tip may be reduced, in particular during cooling when the material inside of the pre-chamber tip is still hotter than in the areas surrounding it and the high temperatures would lead to plastic deformations inside of the pre-chamber tip.

INDUSTRIAL APPLICABILITY

With reference to the Figures and in operation, a pre-chamber body 1 for an internal combustion engine is suggested, comprising a pre-chamber tip 10 with a pre-chamber 14 defined by an encircling side wall 12 and at least one flow transfer passage 2 fluidly connecting the pre-chamber 14 and an exterior of the pre-chamber body 1, the flow transfer passage 2 extending through the encircling wall 12, wherein the side wall 12 is provided with at least one stiffness reduced section in proximity or adjacent to the flow transfer passage 2.

The pre-chamber body 1 as mentioned above is applicable in internal combustion engines and especially in internal combustion engines which are powered with a lean fuel air mixture of a gaseous fuel and air, for example a mixture of natural gas and air. It may replace conventional pre-chamber bodies and may serve as a replacement or retrofit part.

The invention claimed is:

1. A pre-chamber body for an internal combustion engine, comprising a pre-chamber tip with a pre-chamber defined by an encircling side wall and two flow transfer passages fluidly connecting the pre-chamber and an exterior of the pre-chamber body, the flow transfer passages extending through the encircling wall, wherein each of the flow transfer passages have an outer opening formed at an outer surface of the the side wall and an inner opening formed at an interior surface of the side wall that opens the respective flow transfer passage into the pre-chamber, the inner openings are adjacent to each other and separated from one another by a section of the interior surface of the side wall, the outer openings are adjacent to each other, the outer surface of the side wall is provided with a stiffness reduced section between the adjacent outer openings of the flow transfer passages, after the stiffness reduced section is provided the section of the interior surface remains, and the stiffness reduced section configured to reduce the rigidity of the section of the interior surface of the side wall.

2. The pre-chamber body according to claim 1, wherein, due to the stiffness reduced section, a material thickness of the side wall is reduced, in particular locally reduced.

3. The pre-chamber body according to claim 2, wherein the side wall, due to the stiffness reduced section, has a reduced material thickness that is between 50% to 75% of a non-reduced thickness of a section of the side wall adjacent to the stiffness reduced section.

4. The pre-chamber body according to claim 1, wherein the stiffness reduced section is a groove or a notch extending along a longitudinal direction of the pre-chamber body.

5. The pre-chamber body according to claim 1, wherein the stiffness reduced section extends helicoidally over the side wall along a longitudinal direction of the pre-chamber body.

6. The pre-chamber body according to claim 1, wherein a second stiffness reduced section extends circumferentially on an outside and/or inside of the side wall around the longitudinal direction of the pre-chamber body.

7. The pre-chamber body according to claim 6, wherein the second stiffness reduced section is a circumferential groove extending around a circumference of the pre-chamber tip.

8. The pre-chamber body according to claim 1, wherein a second stiffness reduced section is provided at an end face of the outside surface of the side wall of the pre-chamber body tip, the second stiffness reduced concaving towards the pre-chamber.

9. The pre-chamber body according to claim 1, wherein a second stiffness reduced section is provided circumferentially around the flow transfer passage on the outside and/or inside of the side wall.

10. The pre-chamber body according to claim 9, wherein the second stiffness reduced section is provided in the form of a circular milling groove around an outer opening of the flow transport passage.

11. The pre-chamber body according to claim 1, wherein a second stiffness reduced section in the flow transfer passage is formed by at least one tube extending through the side wall.

12. The pre-chamber body according to claim 1, wherein a second stiffness reduced section is a recess or a countersink provided at an inner opening of the flow transfer passage.

13. The pre-chamber body according to claim 1, wherein a second stiffness reduced section is provided in the form of a conical flow transfer passage, which in particular tapers in a direction from the exterior of the pre-chamber body to the pre-chamber.

14. The pre-chamber body according to claim 7, wherein the second stiffness reduced section is connected to the stiffness reduced section.

15. The pre-chamber body according to claim 7, wherein the second stiffness reduced section is provided above the outer openings, and the side wall below the outer openings remains after the second stiffness reduced section is provided.

* * * * *